Jan. 29, 1963  A. SCHOLAERT  3,075,273
BELT CONTROL SYSTEM FOR WORKER ROLLERS OF
NAP RAISING MACHINES
Filed March 15, 1960

INVENTOR
ALBERT SCHOLAERT

BY *Richards & Geier*

ATTORNEYS

United States Patent Office 3,075,273
Patented Jan. 29, 1963

3,075,273
BELT CONTROL SYSTEM FOR WORKER ROLLERS
OF NAP RAISING MACHINES
Albert Scholaert, 92 rue de l'Amiral Courbet,
Tourcoing, Nord, France
Filed Mar. 15, 1960, Ser. No. 15,153
Claims priority, application France Mar. 17, 1959
1 Claim. (Cl. 26—35)

This invention relates to belt control systems for worker rollers of nap raising machines, more particularly those of the type wherein the worker rollers arranged along the generating lines of a cylindrical surface are driven into rotation by a belt surrounding tangentially a system of pulleys of equal diameter mounted on the ends of the corresponding worker roller shafts and which, between two predetermined successive worker rollers, forms a loop which extends inwardly of said cylindrical surface and engages a driving pulley coaxial with said surface.

Such conventional arrangements are not wholly satisfactory, since the arcuate line along which the belt is in contact with the pulleys of the two above-mentioned successive worker rollers is much larger than the arcuate line along which it is in contact with the pulleys of each of the other worker rollers. The result is that the belt slides to a much greater extent over the pulleys of the latter worker rollers other than over the two successive worker rollers considered. The intensity of raising produced by said two successive worker rollers is thus very different from the raising intensity supplied by any other worker, which leads to jerks in the treatment of the fabric and risks producing damage to the latter.

The object of the invention consists in a belt-controlled worker roller-driving system showing none of the above-mentioned drawbacks.

To this end, and according to the invention, two belt-shifting rollers are inserted between the pulleys coaxially rigid with said successive worker rollers, the location of the axes and the diameters of said shifting rollers being such that the belt, before forming a loop between said shifting rollers, passes over the pulleys of the two above-mentioned successive worker rollers and remains in contact with said pulleys over arcs the length of which is substantially equal to that of the arcs along which it is in contact with the pulleys of any other worker roller.

Through this arrangement, the length of the arc over which the belt engages the driving pulley of each of the worker rollers is the same for all the worker rollers. The result is that the sliding of the belt is substantially uniform over all the pulleys and all the worker rollers operate consequently in the same manner.

The invention will be better understood upon reading of the following description and upon examination of the accompanying drawings which show, by way of example and in a non-limiting manner, an advantageous embodiment of my invention. In said drawings.

Figure 1:
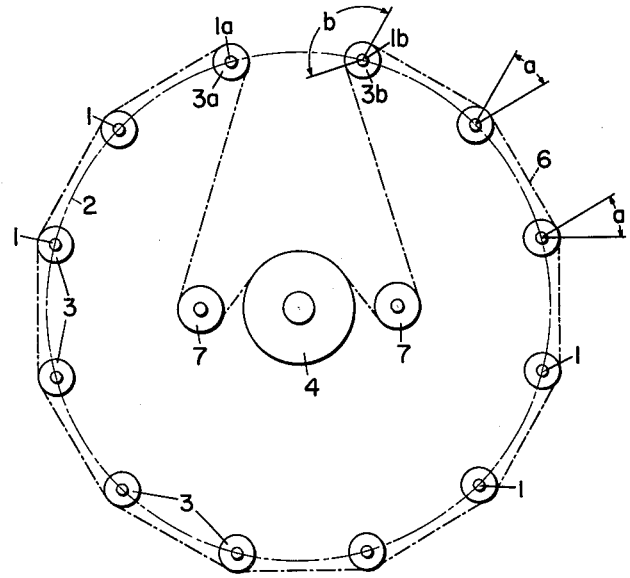
FIG. 1 shows diagrammatically the conventional belt controlled arrangement driving the worker rollers of a nap raising machine.

Referring now to FIG. 1, there are shown diagrammatically the shafts 1 carrying the worker rollers of a nap raising machine and the axes of which are arranged along the generating lines of a geometrical cylindrical surface 2. To the end of each of the shafts 1 facing a predetermined direction is secured a pulley 3 and a pulley 4 driving the worker rollers is arranged coaxially with the cylindrical surface.

A belt 6 engages tangentially and outwardly the system of all the driving pulleys 3 and between two predetermined successive worker rollers, for instance those the shafts of which are shown at 1a and 1b, said belt is shifted inwardly of the cylindrical surface 2 to form a loop passing over auxiliary pulleys 7 and over the driving pulley 4.

It is obvious that in said arrangement the arc $a$ along which the belt 6 is in contact with the pulleys of each of the worker rollers mounted on a corresponding shaft 1, to the exclusion of those mounted on the shafts 1a and 1b, is much smaller than the arc $b$ along which the belt is wound over the pulleys 3a and 3b rigid with the worker rollers mounted on the two above-mentioned shafts 1a and 1b. The result is, as mentioned hereinabove, that with this known arrangement, the sliding of the belt is not the same over the pulleys driving the two worker rollers fitted through the shafts 1a and 1b as over the pulleys driving all the other worker rollers, which leads to a non-uniform work of the worker rollers.

Figure 2:
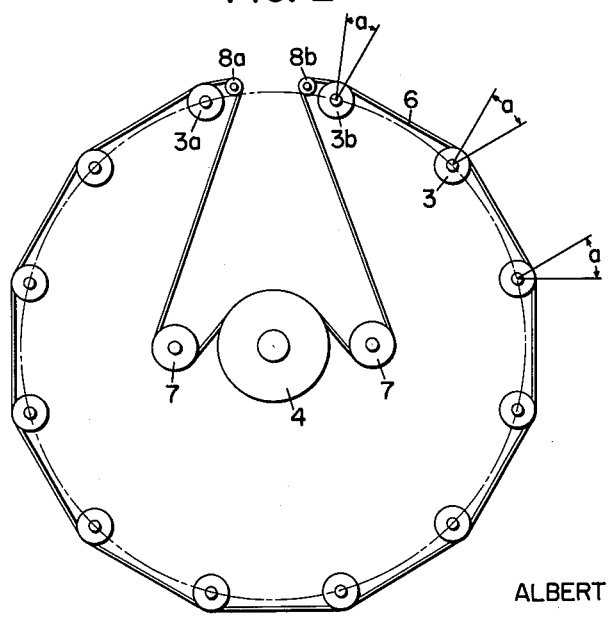
FIG. 2 illustrates diagrammatically the same arrangement provided with the improvement according to the invention.

In the embodiment according to the invention, which is illustrated in FIG. 2, there are added to the known arrangement of FIG. 1 two belt-shifting rollers 8a and 8b of equal diameter and smaller than the diameters of shaft-carried pulleys between the pulleys 3a and 3b, the location of axes of said shifting rollers, as also their diameter being such that the belt 6 passes, to either side of the loop formed by it, between said rollers and around the pulley 4, over the above-mentioned pulleys 3a and 3b, while remaining in contact with the latter along arcs $a$, the length of each of which is substantially equal to the length of the arc $a$ along which it is in contact with any of the pulleys 3 driving the other worker rollers. As shown rollers 8a, 8b have generating lines coinciding with generating lines of the cylindrical surface.

Under such conditions, it will be readily understood that the extent of the sliding of the belt over the pulleys driving the different worker rollers is substantially the same, so that all the worker rollers, including those carried by the shafts 1a and 1b, operate under the same conditions.

Obviously, my invention is not limited to the embodiment described and illustrated which has been given by way of a mere exemplification; it is possible to bring thereto numerous modifications within reach of anyone skilled in the art, without widening thereby the scope of the invention as defined in the accompanying claim. The belts are not necessarily flat and they may assume, for instance, a trapezoidal cross-section and, generally speaking, they may be of any suitable type.

What I claim is:

In a nap raising machine, in combination, a plurality of nap roller-carrying shafts the axes of which are disposed along generating lines of a cylindrical surface, a separate shaft-carried pulley fixed to one end of each shaft, said shaft-carried pulleys being of the same diameter, a driving pulley located coaxially with said cylindrical surface, two auxiliary pulleys on opposite sides of said driving pulley and within said cylindrical surface, a belt-shifting roller disposed adjacent to one of said shaft-carried pulleys and having a generating line coinciding with a generating line of said cylindrical surface, another belt-shifting roller facing the first-mentioned belt-shifting roller and located adjacent a second shaft-carried pulley which is circumferentially adjacent said one shaft-carried pulley, said other belt-shifting roller having a generating line coinciding with a generating line of said cylindrical surface, the diameters of said belt-shifting rollers being equal to each other and smaller than the diameters of said shaft-carried pulleys, and an endless belt extending in sequence over said one shaft-carried pulley, the first-mentioned belt-shifting roller, one of said auxiliary pulleys, said driving pulley, the other one of said auxiliary pulleys, said other belt-shifting roller, the second shaft-carried pulley and over the other shaft-carried pulleys to said one shaft-carried pulley, the size and location of said belt-shifting rollers being such that the belt remains in contact with each of the shaft-carried pulleys along an arc substantially equal to the arc of contact of the belt with each shaft-carried pulley.

References Cited in the file of this patent

UNITED STATES PATENTS

| | | |
|---|---|---|
| 2,120,576 | Scholaert | June 14, 1938 |

FOREIGN PATENTS

| | | |
|---|---|---|
| 3,028 | Great Britain | of 1879 |
| 709,261 | Great Britain | May 10, 1954 |